US005597628A

United States Patent [19]

Cetrelli et al.

[11] Patent Number: 5,597,628

[45] Date of Patent: Jan. 28, 1997

[54] LINING

[75] Inventors: Renzo Cetrelli, Finspong; Ingvar Hultmark, Norrköping, both of Sweden

[73] Assignee: ABB Carbon AB, Finspong, Sweden

[21] Appl. No.: 293,199

[22] Filed: Aug. 19, 1994

Related U.S. Application Data

[63] Continuation of Ser. No. 30,107, filed as PCT/SE91/00593, Sep. 10, 1991, published as WO92/04983, Apr. 2, 1992, abandoned.

[30] Foreign Application Priority Data

Sep. 14, 1990 [SE] Sweden .................................. 9002924

[51] Int. Cl.$^{6}$ ....................................................... F16L 9/22

[52] U.S. Cl. ....................... 428/34.6; 428/34.4; 428/34.5; 34/79; 34/82; 55/523; 55/459.1; 138/140; 138/141; 138/143

[58] Field of Search ................................. 428/34.4, 34.5, 428/34.6; 34/79, 82; 55/523, 459.1; 138/140, 141, 143

[56] References Cited

U.S. PATENT DOCUMENTS

| | | | |
|---|---|---|---|
| 4,281,510 | 8/1981 | Börjesgard et al. | 60/39.32 |
| 4,536,455 | 8/1985 | Maeda et al. | 428/629 |
| 4,773,356 | 9/1988 | Black | 122/6 A |
| 4,797,203 | 1/1989 | Macierewicz | 209/211 |
| 4,810,273 | 3/1989 | Komoda | 55/487 |
| 4,956,090 | 9/1990 | Robinson | 210/512.1 |
| 5,206,880 | 4/1993 | Olsson | 373/111 |

FOREIGN PATENT DOCUMENTS

| | | |
|---|---|---|
| 0094098 | 11/1983 | European Pat. Off. . |
| 1540458 | 2/1979 | United Kingdom . |

*Primary Examiner*—James J. Seidleck
*Assistant Examiner*—Michael A. Williamson
*Attorney, Agent, or Firm*—Pollock, Vande Sande & Priddy

[57] ABSTRACT

An inner liner for a tubular casing, with the casing having a support means for coaxially supporting the liner within the casing. The liner has an axis and is made of material having a different coefficient of linear expansion than the casing, and comprises at least one tubular section having an outer surface which defines at least one conical support section for resting against the support means at contact points with the support means. The contact points are located on generatrices of a conceived cone or pyramid, with the generatrices radiating from a fixed point on the axis of the liner coinciding with the tip of the cone or pyramid.

11 Claims, 2 Drawing Sheets

LINING

This application is a continuation of Ser. No. 08/030,107, filed as PCT/SE91/00593, Sep. 10, 1991, published as WO92/04983, Apr. 2, 1992, now abandoned.

TECHNICAL FIELD

The present invention relates to a lining in which a material with a certain coefficient of linear expansion constitutes lining for another material with a different coefficient of linear expansion. In particular, the invention aims to solve the problem with the relative linear displacements in connection with cyclic changes in temperature of the respective materials.

BACKGROUND OF THE INVENTION

In industrial applications there is often a need to line certain elements with a material which exhibits properties quite different from the material from which the element is made. As an example may be mentioned tubes, tanks, nozzles or similar devices which are to withstand, for example, high temperature, variations in temperature, erosion from particle flows, or some other type of degrading influence on the material.

The present invention is applicable within each technical field in which linings of the above-mentioned kind are desirable. To describe the problems which arise in connection with lining and the solutions that are currently applied, known technique involving ceramic lining of tubes exposed to high temperatures and/or erosive particle flows is chosen.

In boiler plants, flue gas tubes, cleaning plants for flue gases and the like, usually some steel quality is used in walls and casings. If these casings were to be exposed to the influence of very hot flue gases containing erosive particles for a substantial period of time, and under the effect of temperature fluctuations, these casings would be worn out relatively quickly. For this reason, cyclones, for example, which constitute dust cleaning devices in, among other things, fossil fuelled power plants, are usually provided with a lining, usually of a ceramic material.

In a cyclone, a vortex of, for example, flue gases moves from a higher to a lower level inside a cyclone wall with a downwardly tapering circular cross section. During the downward flow, the speed of the gas flow increases, causing heavier particles present in the gas vortex to be thrown out against the cyclone wall and then to fall down into cyclone legs which form dust outlets from the cyclone. The cleaned gas is discharged at the upper part.

For operation of gas turbines connected to cyclones of the above-mentioned type, the highest possible gas temperature is desired at the inlet of the turbine. This means that gas cleaners which separate dust from combustion gases operate at the temperature of the combustion gases when these leave a bed in a combustion plant.

A combustion plant of, for example, PFBC type operates with a gas temperature which may amount to 950° C. This high temperature entails heavy stresses in the cyclones for cleaning of the combustion gases before these are supplied to a turbine. The problems are particularly significant in the lowermost part of the cyclone and in the cyclone legs. The high speed of the greatly abrasive, erosive particles in the gas mass and the high temperature reduce the strength of the cyclone material and deteriorate its resistance to wear.

Despite different forms of cooling of cyclones and different designs of cyclones and cyclone legs, the problem with the heavy wear on the cyclone material from dust in the gas remains. This has made it necessary to provide cyclones with an erosion-resistant material, usually in the form of a lining. This lining may be formed from ceramic material, which has long been known in the art. In already existing PFBC energy plants, the cyclones have been internally lined with a high-resistant ceramic material.

One way of providing cyclones or other corresponding devices with a ceramically resistant material according to known technique is to apply a steel net with hexagonal meshes to the surface which is to be coated. The net is spot welded to this surface. The net has a certain thickness, since the net is formed from steel bands. Inside each mesh there are central holes in the steel band. After application, the meshes in the steel net are filled with a ceramic material, usually aluminium oxide, which is fixed in position by the ceramic material penetrating also the holes in the steel band. The ceramic gives the surface good resistance to erosion and provides good protection against fires which may arise under certain conditions. In addition, the ceramic withstands temporary increases in temperature. One problem, however, is caused by the different coefficients of linear expansion of the ceramic and the lined material.

Upon start-up, cyclones are heated from room temperature to operating temperature for a relatively long time. When the ceramic gradually reaches the operating temperature, the temperature of the cyclone wall has risen to about 850° C. or around 350° C. depending on whether insulation has been applied outside the cyclone wall or between the ceramic and the steel wall.

Prior to start-up of the plant, there are small gaps, at a temperature of about 20° C., between the hexagonal ceramic plates inside the steel meshes and the steel bands of these meshes. During a heating period and because of the greater liner expansion of the steel material, the width of these gaps is increased, dust from the flue gases being packed into these gaps. During the subsequent shrinkage of the materials during an interruption of the operation, or a reduction of the temperatures of the two materials for some other reason, stresses in the ceramic material will arise because of the above-mentioned packing of dust into the gaps, which results in the ceramic being easily broken. This problem, of course, is aggrevated by repeated increases and falls in temperature.

Another problem arises with the existing temperature gradient across the inside and outside of the ceramic. Under certain conditions, the temperature difference beween inside and the outside of the ceramic is very great, which causes cracking of the ceramic material. One reason for these temperature differences is that flue gas is not allowed to sweep around the back of the ceramic material.

Nor are the currently used ceramics for the above-mentioned technique sufficiently erosion-resistant. More erosion-resistant ceramics are available but require a different application.

Another variant of the solution to the problem of two materials in a lining expanding to differing degrees during heating is taken from an example with a ceramic lining of a steel casing. Ceramic plates are provided with cast-in steel holders. These holders are welded to the steel casing such that a certain gap arises between the steel casing and the ceramic. The space formed by this gap is filled with insulation. In this way, the ceramic and the steel casing may be maintained at different temperatures. The two sides of the ceramic assume, for example, the temperature 850° C. whereas the steel casing is allowed a maximum temperature of, for example, 350° C. By controlling the temperature which is adopted by the respective material, it will be possible to impart to each material the same linear expansion. This causes the two materials to be expanded to the same degree, so there will be no mutual displacements between the two materials. However, also this solution has its disadvantages, since what is stated above only applies to the steady state. Under heating or cooling conditions, stresses may arise or a dust-accumulating growth of gaps may arise in the ceramic.

A specification of requirements may be drawn up for a lining, the aim of which is to reach a solution to the problems described above. It is, for example, desirable to have large, smooth, continuous surfaces while avoiding joints in the ceramic lining. Another desire is to have as few contact points as possible between the lining and the casing. In addition, it is advantageous to provide a gap between the lining and the casing. In this way, in the example using cyclones, a small amount of gas may sweep over the back side of the lining, causing the back side to adopt the same temperature as the front to avoid temperature gradients over the lining material. By means of such a gap, dust penetrating in between the lining and the casing may also be allowed to exit out of the gap.

Aimed at a solution to the above-mentioned problems, a new design relating to a ceramic lining has been developed. However, the principle of the solution is of such a general nature that it may be applied to a plurality of technical fields.

SUMMARY OF THE INVENTION

The present invention may be briefly described as a lining of one element which constitutes an outer casing by means of another element which constitues an inner lining for the casing, the materials in the two elements having different coefficients of linear expansion. The lining is characterized in that the linear expansion of both materials is adapted to emanate from one single common fixed point and that all contact points between the two elements are positioned on an imaginary cone or a polygonal pyramid, the tip of the cone or the pyramid coinciding with the fixed point, such that the contact points between the two elements are located on the generatrices of the cone, and under relative linear displacements, caused by temperature changes in any of the elements, the contact points have been given a possibility of free movement along the generatrices through the respective contact point.

During heating of a body, if the body is homogeneous and is uniformly heated, each point of the body moves under linear displacements, caused by temperature fluctuations of the body, along a ray which runs from an optional fixed point inside the body. That is to say, if each point in the body is viewed from this fixed point, it seems as if, for example during thermal expansion of the body, each point belonging to the body moves away rectilinearly outwards from the fixed point. The corresponding situation, of course, applies to a contraction of the body, when the points move inwardly towards the fixed point. The displacement of the points of the body in the longitudinal direction is in direct proportion to the distance of the respective point from the fixed point. From what has been stated it follows that a homogeneous body during an expansion or a contraction retains the same shape and proportions. What is of interest in this connection is what happens when a body is fixed at a point on the surface of or inside the body. When the body is fixed in such a way, each section through the body with a changed volume will be a uniform reproduction of the corresponding section through the body before the change in volume with the fixed point in a corresponding uniform position.

The known physical principles described above may be utilized to solve problems with linings. As mentioned, it is desirable, for example, to have larger sections of ceramics as lining according to the example above. According to this invention, it is possible to form a ceramic lining in one single unit or in large sections, where the lining is made such that all external surfaces, which are to function as supporting points, which in some way are to contact the casing to be lined, are located on the envelope surface of an imaginary cone. This cone then constitutes a limiting surface for these supporting points. In the same way the interior of the casing is formed, such that this exhibits supporting points for the lining, all of these supporting points also being located on the envelope surface of an imaginary cone. These imaginary cones for the supporting points for the lining as well as for the supporting points for the casing are allowed to coincide, that is, they form one and the same imaginary cone with a common tip. In addition, both the lining and the casing are fixed to the tip of this imaginary cone. In case of relative thermal changes in volume between the lining and the casing, these supporting points will then slide in relation to each other along the envelope surface on the imaginary cone. To be more precise, each individual supporting point slides along a generatrix to the cone. The only point which, in principle, is not subjected to any move because of thermal movements of the materials is the fixed point which is common to the respective element.

The described principle for designing a lining may be applied to all technical fields where thermal movements of materials, which are connected to each other in some way, occur. It may, for example, apply to the lining of tubes with erosion-resistant materials at exposed bends, end stops and the like.

What has been stated above may, of course, be reversed such that a lining is placed outside an element enclosed by the lining according to the same principle. In addition, the invention is not limited to two materials. The same principle may be used even if more than two materials are to coat one another.

DESCRIPTION OF THE PREFERRED EMBODIMENTS

With reference to the accompanying figures, a number of preferred embodiments of the present invention will be described below. As already mentioned, the principle of a lining according to the present invention is applicable to different technical fields. In the following only examples of ceramic linings will be described, but the technical principle employed can be easily transferred to closely related technique for solving the lining problems.

Figure 1:
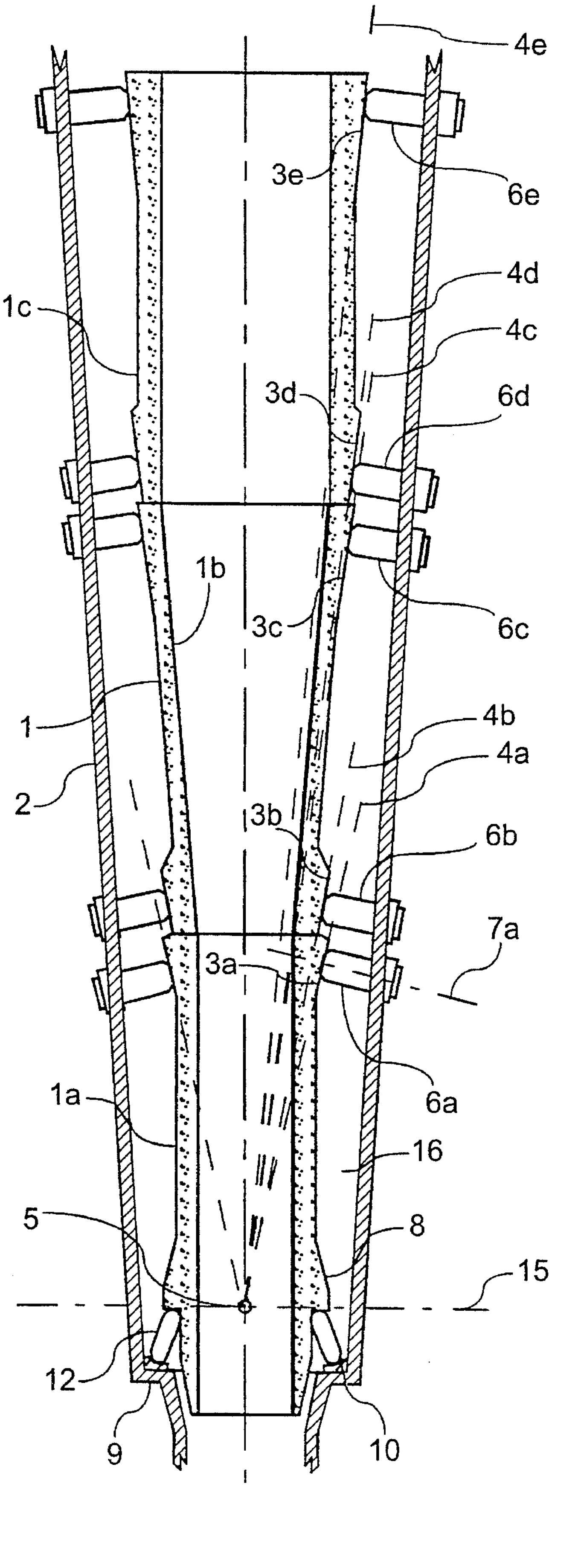
FIG. 1 shows a section through a ceramic lining of a steel shell intended to be used in a cyclone for cleaning flue gases where the lining is divided into several sections.

A lining of a cyclone leg in a flue gas plant is shown in FIG. 1. A ceramic lining 1 is enclosed in a steel shell 2. The steel shell constitutes a cyclone leg and/or the lower conical part of a cyclone leg. Since it is subjected to high temperature, the steel shell is normally lined around 850° C. because of the hot, flowing gas vortex. In addition, the gas in the vortex contains greatly erosive particles. Without a lining, the material in the steel shell would be rapidly worn and deformed.

The ceramic in the lining may be made in one piece or, as in the preferred embodiment, be made in several sections 1*a*, 1*b*, 1*c*, which are stacked on top of each other. Each section 1*a*, 1*b*, 1*c* is made in the form of a tube piece with an internally cylindrical or conical envelope surface. Externally, the respective tube section may be given an optional shape within the scope of the available space and function.

The end surfaces of the tube sections are made plane to allow the tube sections to be stacked one above the other and to provide good sealing between the joints. The tube sections rest freely on one another and each individual tube section is only influenced by forces of gravity from tube sections positioned above, which is the intention of this construction since ceramics has a greater capacity to withstand compressive forces than, for example, tensile forces. The length of each section may suitably be in the range of 700 mm to 900 mm but the length has no other significance than to contribute to a practically manageable solution of the problems of installation and adjustment.

The ceramic tube sections 1*a*, 1*b*, 1*c* need not be manufactured on the spot and can therefore be made in any optional material. It is fully possible to choose the most erosion-resistant and high-strength materials. As examples of such materials may be mentioned silicon carbide, SiC, or silicon nitride, SiN.

Each ceramic tube section is externally provided with at least two annular conical sections 3*a*–3*e*, so that the limiting surface of each such conical section forms a frustum of a cone. These conical sections are chosen such that all generatrices 4*a*–4*e* along the envelope surface of each such frustum of a cone, which forms the conical sections of the tube sections, intersect at one and the same point, called fixed point 5. The conical sections are suitably located at the ends of the respective tube sections, with the exception of the tube end where the ceramic lining is supported, where the embodiment of the end of the corresponding tube section will be described separately below. If the ceramic lining is made as one coherent section, an external conical section 3*e* may, in principle, be sufficient, but the number may be freely chosen according to the circumstances.

On a level with each of the above-mentioned conical section 3*a*–3*e*, the surrounding steel shell 2 exhibits a number of radial supports 6*a*–6*e*. For each separate level these radial supports are arranged in a ring around the steel shell, such a ring of radial supports serving as side supports for the ceramic lining in that each conical section on the lining in principle makes contact with an associated ring of radial supports. The radial supports 6*a* may be angled such that the longitudinal axis 7*a* through the respective radial support is perpendicular to the nearest generatrix 4*a* of the associated conical section of the lining, as shown in the figures. Since such an embodiment requires greater effort during manufacturing, it is more suitable that only the contact surfaces on the supports 6*a*–6*e* are arranged to be parallel to a tangential plane through the generatrix of the associated conical section of the lining. In this way, the necessity of an accurate alignment of the longitudinal axes of the radial supports is dispensed with.

The lowermost one 1*a* of the tube sections of the ceramic lining is formed with a collar 8, at a certain distance above the lowermost tube end, with a larger outside diameter than the outside diameter of this tube section below the collar. This collar has a substantially horizontal lower surface.

Figure 2:
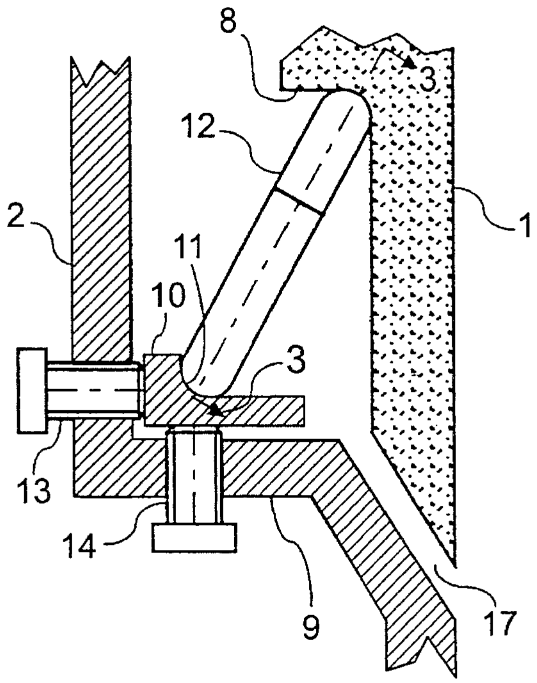
FIG. 2 illustrates a section through a part in the supporting device for the ceramic lining according to FIG. 1.
Figure 3:
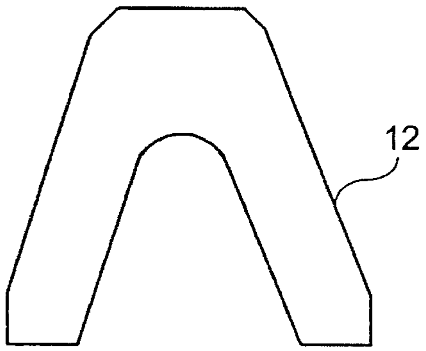
FIG. 3 illustrates a cross section through a supporting yoke according to section A—A in FIG. 2.

In the lower part of the steel shell, a certain distance below the level of the collar 8, the steel shell changes into a conical/cylindrical section with a smaller outside diameter. At this transition a substantially horizontal shelf 9 is formed in the steel shell (see FIG. 2). On this shelf there rests a circular support ring 10 with an appearance resembling that of a ring-half for a radial bearing. The support ring 10 has a surrounding circular and cupped surface 11 directed upwardly and inwardly and towards the center of the ring.

To support the ceramic lining 1, a number of supporting elements (hereinafter called flexible supports) 12 are arranged in a ring between the ceramic lining 1 and the steel shell 2. Each flexible support 12 rests with its lower end in the cupped surface 11 of the support ring 10 and with its upper end against a rounded part of the ceramic lining which is formed in the angle between the lowermost outer neck of the ceramic lining and the collar 8. By this mounting, the flexible supports 12 will carry the weight of the ceramic lining 1 and transfer this weight to the support ring 10 and further to the shelf 9 on the steel shell 2.

The purpose of the loose flexible supports 12 is to bring about an accurate centering of the ceramic lining 1 in the steel shell 2, so that the symmetry axes for the lining 1 and the steel shell 2 coincide and extend through the fixed point 5. If, for example, the steel shell 2 is expanded to a major extent in relation to the lining 1, the lower supporting legs on the respective flexible supports will be displaced horizontally outwards from the center, the flexible supports 12 then adopting a somewhat more inwardly sloping position than earlier. In this way, the lining is lowered to some small extent in relation to the steel shell, but the lining is still maintained centered by the uniform influence from all the flexible supports.

For centering the lining and a uniform adoption of pressure from the collar 8 of the lining, the vertical and horizontal positions of the support ring 10 are adjusted by means of both horizontal adjusting screws 13 through the wall of the steel shell and vertical adjusting screws 14 through the shelf 9.

The flexible supports 12 are formed as yokes with the yoke legs downwardly rounded and resting in the cupped surface 11. The flexible supports are rounded also at the top to conform well to the cupped shape below the collar of the lining. The flexible supports 12 are placed close to each other so that each yoke leg on a flexible support in the lateral direction supports against an adjacent flexible support in the ring of such supports.

The main principle according to the invention is that the two different materials in the ceramic and in the steel casing, respectively, should have one single common point, from where all linear expansion or contraction caused by changes in temperature emanates for the different materials. In the present invention, the lining and the steel casing are adapted to include such a point, which is the only point which is common and coinciding under relative temperature displacements between the two materials. This point is the same as the point 5. In this case the fixed point 5 has been located at the point of intersection between a plane 15 through the lower side of the ceramic collar 8 and the common axis of rotation for the steel shell 2 and the ceramic lining 1. Under temperature changes the two materials are allowed to be displaced from this common fixed point, which means that the plane 15 through the collar of the lining cannot be allowed to become displaced in the vertical direction. If the steel shell expands to a larger extent than the lining, the flexible supports 12 will adopt a more inwardly inclined position, causing the lining to be somewhat lowered. However, this vertical lowering of the lining is only of marginal importance and is negligible. In the case of a ceramic lining, the flexible supports 12, which are made of steel, also have a greater linear expansion than the ceramic, vertical relative movements thus cancelling each other out.

In the case of relative changes of volume because of temperature fluctuations, the two materials, the steel shell and the lining, will be able to move in relation to each other since the conical sections **3*a*–3*e* are able to slide along the radial supports 6*a*–6*e* along the above-mentioned generatrices 4*a*–4*e*, which converge at the fixed point 5**. This is independent of which of the two materials expands or contracts. The lining material will not be subjected to any stresses. This is true provided that the two materials are homogeneous and not influenced by any residual stresses.

Between the lining 1 and the shell 2 a natural gap 16 is provided, which allows a small amount of gas to flow along this space via the gap 18. In this way, the outer side of the lining will be subjected to the same temperature as its inner side. Also this fact contributes to reduce the risk of temperature gradients arising in the lining material and the risk of stresses therein.

Since the gas also contains dust, there is a risk that this dust clogs the space in the gap 16. At the lower end of the lining a gap 17 is arranged, through which gas and dust are able to flow out. At the upper part of the gap 16, the gas pressure is higher than at the lower part, causing dust to be blown out of the space between the lining and the shell through the lower gap 17. The width of this gap 17 may be chosen freely by making the downwardly projecting throat below the collar 8 on the lining longer or shorter.

The flexible supports 12 have been deliberately designed as yokes, thus forming openings, in this case between the legs of the yokes and between the flexible supports. This allows gas and dust in the gap 16 to traverse the ring of flexible supports and flow out through the lower gap 17.

Figure 4:
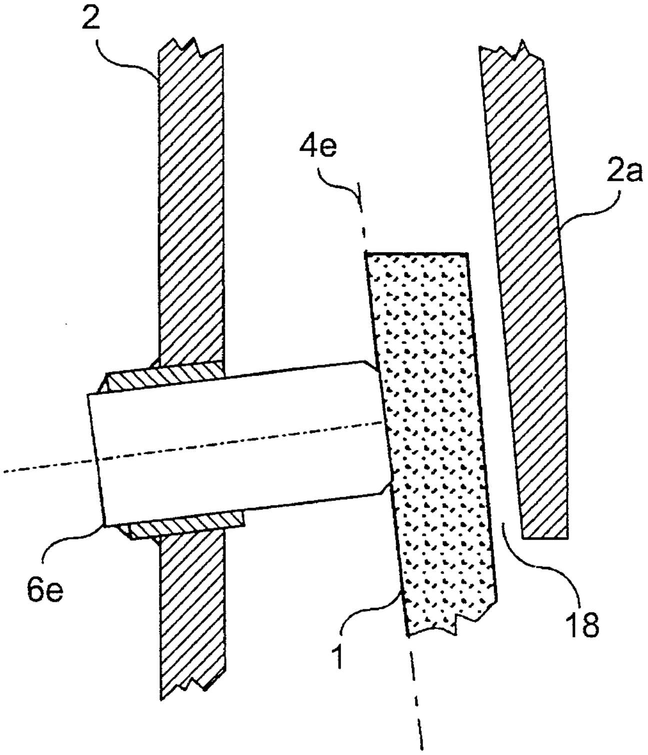
FIG. 4 shows the embodiment of the connection between the upper part of the lining and the shell.

In the upper part of the lining, a gap 18 is arranged. As indicated in FIG. 4, the steel shell 2 can be made with an inner collar which hangs down over the end of the lining as a lip **2*a*, between which lip and the uppermost lining end the upper gap 18 is formed. Since both the inside of the end of the lining tube and the outside of the overhanging lip 2*a* towards the lining end are angled in the direction of the fixed point 5, the gap 18 maintains the same width also in case of temperature movements of the two materials. The width of this gap 18** may be freely chosen.

In an alternative embodiment of the ceramic according to the above embodiment, it is possible to utilize two separate ceramics in the lining. For example, a more inexpensive material with lower erosion resistance but with higher strength in case of a large volume of the body may be used as an external frame in a lining according to the above. The inside of the frame is then coated with smaller plates of a different ceramic with the desired properties, such as erosion resistance. Plates with, for example, silicon carbide may then internally coat a frame of aluminium oxide.

We claim:

1. A tubular member having an inner liner, said liner having an axis and being made of material having a different coefficient of linear expansion than said casing, said liner being supported in said casing by support means coaxially supporting said liner within said casing, said liner comprising at least one tubular section having an outer surface which defines at least one conical support section for resting against at least one set of angularly disposed radial supports, included in said support means, at a plurality of contact points with said radial supports, said contact points being located on generatrices of a conceived cone or pyramid, said generatrices radiating from a fixed point on the axis of said liner coinciding with the tip of said cone or pyramid;

said support means also including flexible support members longitudinally spaced from said radial supports for flexibly supporting said liner in said casing wherein said fixed point maintains fixed position with respect to said liner and said casing upon thermal volumetric changes of at least one of said liner and said casing.

2. A tubular member according to claim 1, wherein the contact points and the radial supports upon thermal volumetric changes of at least one of the liner and the casing slide along the generatrices.

3. A tubular member according to claim 1, said liner is made of at least one ceramic material.

4. A tubular member according to claim 1, including a plurality of the tubular sections which are piled on top of each other such that the liner is loaded with substantially compressive stresses.

5. A tubular member according to claim 4, wherein said liner at its bottom end is supported by said flexible support members of said supporting means.

6. A tubular member according to claim 4, wherein the upper and lower ends, respectively, of the liner are provided with a gap, which gap adjusts the magnitude of a sub-flow of a medium flowing inside said liner, said sub-flow being diverted to traverse the gap between the liner and the casing.

7. A tubular member according to claim 1, wherein the contact surface of the respective radial supports with said liner is parallel to the generatrix at which the respective contact point is located.

8. A tubular member according to claim 3, wherein the ceramic in said liner consists of at least one of silicon nitride, silicon carbide, or aluminum oxide.

9. A tubular member having an inner liner comprising said tubular member including at least one angularly disposed first support means and a second support means, said first support means radially extending around said liner for coaxially supporting said liner within said tubular member, said liner having an axis and being made of material having a different coefficient of linear expansion than said tubular member;

said inner liner including at least one tubular section having an outer surface which defines at least one frustoconical support section for resting against said first support means at least at a first set of a plurality of contact points with said first support means, said outer surface being spaced apart from an inner surface of said tubular member, said at least first set of a plurality of contact points on said frustoconical support section being located on generatrices of a conceived cone or pyramid;

said generatrices radiating from a fixed point on the axis of said liner coinciding with the tip of said cone or pyramid;

said at least first set of contact points being displaceable along said frustoconical section with volumetric change of at least one of said inner liner and said tubular member; and said second supporting means being designed to flexibly support said liner such that with volumetric change of at least one of said liner and said tubular member, an axis of said tubular member coincide with the axis of said liner and extends through said fixed point.

10. A tubular member according to claim 9, wherein the second supporting means comprises a number of annularly arranged flexible supports, wherein the upper ends of said supports rest against a cupped surface in a collar around the bottom end of the liner and wherein lower ends of the flexible supports rest against a cupped surface in a circular support ring, supported by the tubular member.

11. A tubular member according to claim 10, wherein said flexible supports are arranged to provide openings in the ring formed of flexible supports and wherein the upper and lower contact surfaces of the flexible supports are rounded.

* * * * *